US009335747B2

(12) United States Patent
Steven et al.

(10) Patent No.: US 9,335,747 B2
(45) Date of Patent: *May 10, 2016

(54) SYSTEM AND METHOD FOR ENERGY MANAGEMENT

(71) Applicant: Viridity Energy, Inc., Philadelphia, PA (US)

(72) Inventors: Alain P. Steven, Lansdale, PA (US); Audrey A. Zibelman, Phoenixville, PA (US)

(73) Assignee: VIRIDITY ENERGY, INC., Philadelphia, PA (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/895,894

(22) Filed: May 16, 2013

(65) Prior Publication Data

US 2014/0067142 A1    Mar. 6, 2014

Related U.S. Application Data

(63) Continuation of application No. 12/850,918, filed on Aug. 5, 2010, now Pat. No. 8,457,802.

(60) Provisional application No. 61/279,589, filed on Oct. 23, 2009.

(51) Int. Cl.
*G06F 19/00* (2011.01)
*G05B 13/04* (2006.01)
(Continued)

(52) U.S. Cl.
CPC .............. *G05B 13/041* (2013.01); *G06Q 10/00* (2013.01); *H02J 3/008* (2013.01); *H02J 3/381* (2013.01);
(Continued)

(58) Field of Classification Search
CPC ....... G05B 13/041; G06Q 10/00; H02J 3/008; H02J 3/32; H02J 3/381; H02J 3/383; H02J 2003/003; H02J 2003/007; Y04S 10/54; Y04S 40/22; Y04S 50/10; Y02E 10/563; Y02E 10/566; Y02E 60/76
USPC .................................................. 700/291, 295
See application file for complete search history.

(56) References Cited

U.S. PATENT DOCUMENTS 5,544,036 A    8/1996    Brown et al.
5,566,084 A    10/1996    Cmar
(Continued)

FOREIGN PATENT DOCUMENTS

EP    0791280 A1    8/1997
WO    2011/100736 A2    8/2011
(Continued)

OTHER PUBLICATIONS

Albadi et al., "Demand Response in Electricity Markets: An Overview", IEEE Power Engineering Society General Meeting, 2007 (5 pages).

(Continued)

*Primary Examiner* — Michael D Masinick
(74) *Attorney, Agent, or Firm* — McCarter & English, LLP; Sandra D. M. Brown

(57) ABSTRACT

Embodiments of the present invention assist customers in managing the four types of energy assets, that is, generation, storage, usage, and controllable load assets. Embodiments of the present invention for the first time develop and predict a customer baseline ("CBL") usage of electricity, using a predictive model based on simulation of energy assets, based on business as usual ("BAU") of the customer's facility. The customer is provided with options for operating schedules based on algorithms, which allow the customer to maximize the economic return on its generation assets, its storage assets, and its load control assets. Embodiments of the invention enable the grid to verify that the customer has taken action to control load in response to price. This embodiment of the invention calculates the amount of energy that the customer would have consumed, absent any reduction of use made in response to price. Specifically, the embodiment models the usage of all the customer's electricity consuming devices, based on the customer's usual conditions. This model of the expected consumption can then be compared to actual actions taken by the customer, and the resulting consumption levels, to verify that the customer has reduced consumption and is entitled to payment for the energy that was not consumed.

22 Claims, 7 Drawing Sheets

(51) Int. Cl.
*G06Q 10/00* (2012.01)
*H02J 3/00* (2006.01)
*H02J 3/38* (2006.01)
*H02J 3/46* (2006.01)
*H02J 3/32* (2006.01)

(52) U.S. Cl.
CPC .... *H02J 3/46* (2013.01); *H02J 3/32* (2013.01); *H02J 3/383* (2013.01); *H02J 2003/003* (2013.01); *H02J 2003/007* (2013.01); *Y02E 10/563* (2013.01); *Y02E 10/566* (2013.01); *Y02E 60/76* (2013.01); *Y04S 10/54* (2013.01); *Y04S 40/22* (2013.01); *Y04S 50/10* (2013.01)

(56) References Cited

U.S. PATENT DOCUMENTS

| | | |
|---|---|---|
| 5,794,172 A | 8/1998 | Matheson et al. |
| 6,076,964 A | 6/2000 | Wu et al. |
| 6,178,362 B1 | 1/2001 | Woolard et al. |
| 6,211,782 B1 | 4/2001 | Sandelman et al. |
| 6,681,155 B1 | 1/2004 | Fujita et al. |
| 6,757,591 B2 | 6/2004 | Kramer |
| 6,885,915 B2 | 4/2005 | Rehtanz et al. |
| 6,996,728 B2 | 2/2006 | Singh |
| 7,088,014 B2 | 8/2006 | Nierlich et al. |
| 7,130,719 B2 | 10/2006 | Ehlers et al. |
| 7,135,956 B2 | 11/2006 | Bartone et al. |
| 7,162,878 B2 | 1/2007 | Narayanamurthy et al. |
| 7,206,670 B2 | 4/2007 | Pimputkar et al. |
| 7,209,838 B1 | 4/2007 | Wright et al. |
| 7,222,494 B2 | 5/2007 | Peterson et al. |
| 7,274,975 B2 | 9/2007 | Miller |
| 7,315,769 B2 | 1/2008 | Balan et al. |
| 7,379,997 B2 | 5/2008 | Ehlers et al. |
| 7,393,603 B1 | 7/2008 | Schumer et al. |
| 7,474,995 B2 | 1/2009 | Masiello et al. |
| 7,489,990 B2 | 2/2009 | Fehr et al. |
| 7,529,705 B1 | 5/2009 | Bartels et al. |
| 7,580,817 B2 | 8/2009 | Bing |
| 7,620,482 B2 | 11/2009 | El-Gasseir et al. |
| 7,663,502 B2 | 2/2010 | Breed |
| 7,742,830 B1 | 6/2010 | Botes |
| 7,783,390 B2 | 8/2010 | Miller |
| 7,827,813 B2 | 11/2010 | Seem |
| 7,834,479 B2 | 11/2010 | Capp et al. |
| 7,843,184 B2 | 11/2010 | Wu et al. |
| 7,854,129 B2 | 12/2010 | Narayanamurthy |
| 7,873,442 B2 | 1/2011 | Tsui |
| 7,949,615 B2 | 5/2011 | Ehlers et al. |
| 7,957,845 B2 | 6/2011 | Chen |
| 7,967,754 B2 | 6/2011 | Knight |
| 7,970,482 B2 | 6/2011 | Srinivasan et al. |
| 7,991,513 B2 | 8/2011 | Pitt |
| 8,000,938 B2 | 8/2011 | McConnell et al. |
| 8,019,697 B2 | 9/2011 | Ozog |
| 8,024,073 B2 | 9/2011 | Imes et al. |
| 8,078,330 B2 | 12/2011 | Brickfield et al. |
| 8,090,476 B2 | 1/2012 | Dawson et al. |
| 8,126,685 B2 | 2/2012 | Nasle |
| 8,140,193 B2 | 3/2012 | Lee |
| 8,180,494 B2 | 5/2012 | Dawson et al. |
| 8,234,876 B2 | 8/2012 | Parsonnet et al. |
| 8,295,990 B2 | 10/2012 | Venkatakrishnan et al. |
| 8,367,984 B2 | 2/2013 | Besore et al. |
| 8,395,621 B2 | 3/2013 | Tung et al. |
| 8,396,602 B2 | 3/2013 | Imes et al. |
| 8,396,604 B2 | 3/2013 | Imes et al. |
| 8,412,382 B2 | 4/2013 | Imes et al. |
| 8,457,802 B1 | 6/2013 | Steven et al. |
| 8,521,337 B1 | 8/2013 | Johnson |
| 8,583,520 B1 | 11/2013 | Forbes, Jr. |
| 8,621,097 B2 | 12/2013 | Venkatakrishnan et al. |
| 8,689,020 B2 | 4/2014 | Massey et al. |
| 8,805,550 B2 | 8/2014 | Chemel et al. |

| | | |
|---|---|---|
| 2002/0124000 A1 | 9/2002 | Ooishi |
| 2004/0095237 A1 | 5/2004 | Chen et al. |
| 2004/0117330 A1 | 6/2004 | Ehlers et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0215529 A1 | 10/2004 | Foster et al. |
| 2004/0267513 A1* | 12/2004 | Westermann et al. ......... 703/18 |
| 2005/0033707 A1 | 2/2005 | Ehlers et al. |
| 2005/0234600 A1 | 10/2005 | Boucher et al. |
| 2005/0240427 A1 | 10/2005 | Crichlow |
| 2006/0052918 A1 | 3/2006 | McLeod et al. |
| 2006/0276938 A1 | 12/2006 | Miller |
| 2007/0124026 A1 | 5/2007 | Troxell et al. |
| 2007/0168174 A1 | 7/2007 | Davari et al. |
| 2008/0000381 A1 | 1/2008 | Bartley et al. |
| 2008/0046387 A1 | 2/2008 | Gopal et al. |
| 2009/0093916 A1 | 4/2009 | Parsonnet et al. |
| 2009/0228388 A1 | 9/2009 | Axelrod et al. |
| 2009/0235097 A1 | 9/2009 | Hamilton et al. |
| 2009/0254225 A1 | 10/2009 | Boucher et al. |
| 2009/0281885 A1 | 11/2009 | Castelli et al. |
| 2009/0299537 A1 | 12/2009 | Rea et al. |
| 2009/0313034 A1 | 12/2009 | Ferro et al. |
| 2010/0063644 A1 | 3/2010 | Kansal et al. |
| 2010/0075835 A1 | 3/2010 | Yuge et al. |
| 2010/0076835 A1 | 3/2010 | Silverman |
| 2010/0082172 A1 | 4/2010 | Ko et al. |
| 2010/0106342 A1 | 4/2010 | Ko et al. |
| 2010/0114387 A1 | 5/2010 | Chassin |
| 2010/0168932 A1 | 7/2010 | Van Zyl |
| 2010/0179704 A1 | 7/2010 | Ozog |
| 2010/0217651 A1 | 8/2010 | Crabtree et al. |
| 2010/0218108 A1 | 8/2010 | Crabtree et al. |
| 2010/0286937 A1 | 11/2010 | Hedley et al. |
| 2010/0324962 A1 | 12/2010 | Nesler et al. |
| 2010/0332373 A1 | 12/2010 | Crabtree et al. |
| 2010/0333105 A1 | 12/2010 | Horvitz et al. |
| 2011/0029461 A1 | 2/2011 | Hardin, Jr. |
| 2011/0066258 A1 | 3/2011 | Torzhkov et al. |
| 2011/0078092 A1 | 3/2011 | Kim et al. |
| 2011/0231320 A1 | 9/2011 | Irving |
| 2011/0246898 A1 | 10/2011 | Imes et al. |
| 2011/0246987 A1 | 10/2011 | Diwakar et al. |
| 2011/0257956 A1 | 10/2011 | Goel et al. |
| 2011/0270452 A1 | 11/2011 | Lu et al. |
| 2011/0276527 A1 | 11/2011 | Pitcher et al. |
| 2012/0010757 A1 | 1/2012 | Francino et al. |
| 2012/0245968 A1 | 9/2012 | Beaulieu et al. |
| 2012/0296482 A1 | 11/2012 | Steven et al. |
| 2013/0204443 A1 | 8/2013 | Steven et al. |
| 2013/0245847 A1 | 9/2013 | Steven et al. |
| 2013/0346139 A1 | 12/2013 | Steven et al. |
| 2014/0018971 A1 | 1/2014 | Ellis et al. |
| 2014/0039709 A1 | 2/2014 | Steven et al. |
| 2014/0039710 A1 | 2/2014 | Carter et al. |
| 2014/0039965 A1 | 2/2014 | Steven et al. |
| 2014/0257526 A1 | 9/2014 | Tiwari et al. |
| 2014/0304025 A1 | 10/2014 | Steven et al. |

FOREIGN PATENT DOCUMENTS

| | | |
|---|---|---|
| WO | 2012/019022 A2 | 2/2012 |
| WO | 2012/145563 A1 | 10/2012 |
| WO | 2013/063581 A1 | 5/2013 |
| WO | 2013/067213 A1 | 5/2013 |
| WO | 2013/126800 A1 | 8/2013 |
| WO | 2013/166510 A1 | 11/2013 |
| WO | 2013/166511 A2 | 11/2013 |

OTHER PUBLICATIONS

Athay, "An Overview of Power Flow Analysis", American Control Conference, 1983, pp. 404-410 (7 pages).

Choi et al., "A Daily Peak Load Forecasting System Using a Chaotic Time Series", International Conference on Intelligent System Application to Power Systems, 1996, pp. 283-287 (5 pages).

(56) References Cited

OTHER PUBLICATIONS

Gacek et al., "Implementing the Future Today in Naperville, Illinois", Power Systems Conference: Advanced Metering, Protection, Control, Communication, and Distributed Resources, 2007 (6 pages).

International Search Report and Written Opinion corresponding to International Application No. PCT/US2012/034326 mailed Aug. 10, 2012.

International Search Report and Written Opinion corresponding to International Application No. PCT/US2012/062439 mailed Dec. 31, 2012.

International Search Report and Written Opinion corresponding to International Application No. PCT/US2012/063109 mailed Mar. 14, 2013.

International Search Report and Written Opinion corresponding to International Application No. PCT/US2013/027466 mailed May 3, 2013.

Jacobson et al., "Common Issues in Discrete Optimization and Discrete-Event Simulation", IEEE Transactions on Automatic Control, vol. 47, pp. 341-345, 2002 (5 pages).

Liu et al., "Kalman Filtering with Partial Observation Losses", 43rd IEEE Conference on Decision and Control (CDC), 2004, pp. 4180-4186 (7 pages).

Mount, T. D., Videbaek, S., & Zimmerman, R. D. (2006). Testing alternative market designs for energy and VArs in a deregulated electricity market. Presented at the 25th Annual Eastern Conference, Advanced Workshop in Regulation and Competition, Rutgers Center for Research in Regulated Industries, May 17-19, Skytop, PA.

Notice of Allowance dated Mar. 7, 2013 from U.S. Appl. No. 12/850,918.

Notice of Allowance dated Apr. 11, 2013 from U.S. Appl. No. 12/850,918.

Office Action dated Aug. 16, 2012 from U.S. Appl. No. 12/850,918.

Pai et al., "A Preconditioned Iterative Solver for Dynamic Simulation of Power Systems", IEEE International Symposium on Circuits and Systems (ISCAS), 1995, pp. 1279-1282 (4 pages).

Stuart, "The Benefits of Integrated Systems: A Case Study", IEEE Seminar (Ref. No. 2002/070) on Open System Technologies for Integrated Building Control, 2002 (8 pages).

Tysseling et al., "Higher Education Facilities: The SmartGrid Earns a Doctorate in Economics", Facilities Manager, Mar./Apr. 2011, pp. 18-23 (6 pages).

Zibelman et al., "Empowering Consumers: Moving Intelligence to the Edge of the Grid", Energy Central Topic Centers, T&D Automation, Oct. 2009, vol. 4, Issue 21 (3 pages).

Zibelman et al., "Smart Markets for Smart Grids", Platts Strategic Media Solutions, Insight Magazine, Jun. 2009, pp. 8-9 (2 pages).

Guo et al, "Cutting Down Electrical Cost in Internet Data Centers by Using Energy Storage", University of Florida, IEEE 2011.

Guo et al, "Electricity Cost Saving Strategy in Data Centers by Using Energy Storage", IEEE Transactions on Parallel and Distributed Systems 2013.

International Search Report and Written Opinion corresponding to International Application No. PCT/US2013/039761 mailed Sep. 6, 2013.

International Search Report and Written Opinion corresponding to International Application No. PCT/US2013/039762 mailed Aug. 26, 2013.

Kempton et al., "A Test of Vehicle-to-Grid (V2G) for Energy Storage and Frequency Regulation in the PJM System", University of Delaware Industry-University Research Partnership, Nov. 2008 (32 pages).

Luo et al., "Data Center Energy Cost Minimization: a Spatio-Temporal Scheduling Approach", Stanford University, IEEE INFOCOM 2013.

Notice of Allowance dated Jan. 15, 2015 from U.S. Appl. No. 13/888,309.

Notice of Allowance dated Sep. 17, 2014 from U.S. Appl. No. 13/451,497.

Notice of Allowance dated Dec. 3, 2014 from U.S. Appl. No. 13/888,323.

Office Action dated Jan. 29, 2014, in U.S. Appl. No. 13/451,497.

Office Action dated Oct. 24, 2014 from U.S. Appl. No. 13/774,994.

Qureshi et al., "Cutting the Electric Bill for Internet-Scale Systems", SIGCOMM 2009.

Rao et al., "Minimizing Electricity Cost: Optimization of Distributed Internet Data Centers in a Multi-Electricity-Market Environment", IEEE INFOCOM 2010.

Timmer, John "Saving Money by Load Balancing to Where Electricity is Cheap", arstechnica.com, Aug 17, 2009.

Zhang et al., "Capping the Electricity Cost of Cloud-Scale Data Centers with Impacts on Power Markets", University of Tennessee, HPDC 2011.

Black, D. et al. "Demand Response and Building Energy Simulation." SIMUREX 2012—Conception optimisée du bâtiment par la SIMUlation et le Retour d'Expérience. EDP Sciences, 2012.

Kiliccote, S. et al., "Dynamic controls for energy efficiency and demand response; framework concepts and a new construction study case in New York." Lawerence Berkeley National Laboratory, 2006.

Surles, W. et al., "Evaluation of automatic price based thermostat control for peak energy reductio nunder seidential time-of-use utility tariffs." Energy and Builidings 49, 2012: 99-108.

Vosloo, J. C. et al., "Demand Market Participation (DMP) on small energy users." Industrial and Commercial Use of Energy Conference (ICUE), 2012 Proceedings of the 9th IEEE, 2012.

\* cited by examiner

SYSTEM AND METHOD FOR ENERGY MANAGEMENT

CROSS-REFERENCE TO RELATED APPLICATION

This application claims a priority benefit, under 35 U.S.C. §121, as a continuation application of co-pending U.S. patent application Ser. No. 12/850,918, entitled "SYSTEM AND METHOD FOR ENERGY MANAGEMENT," filed on Aug. 5, 2010. U.S. patent application Ser. No. 12/850,918 claims a priority benefit, under 35 U.S.C. §119(e), of U.S. provisional patent application No. 61/279,589, filed on Oct. 23, 2009, entitled "VPower™ System," by Alain Pierre Steven. Each of the above-identified applications is hereby incorporated herein by reference in its entirety, including drawings.

FIELD OF THE INVENTION

Embodiments of this invention relate to systems and methods of energy management. More specifically, embodiments of this invention relate to the efficient use, management and measurement of electricity consumption.

BACKGROUND OF THE INVENTION

The maintenance of reliable electric service over the power grid requires power grid operators to ensure that the production of energy by electrical generators (supply) on the grid is constantly balanced against the consumption of electricity on the grid (consumer demand).

In the United States regulatory responsibility for the power grid is primarily held by the Federal Energy Regulatory Commission (FERC). Operational responsibility for developing and operating a balanced electric grid is held by individual utilities or independent regional grid operators known in the industry as Independent System Operators ("ISO's") or Regional Transmission Organizations ("RTO's"). There are currently seven RTOs/ISO's operating in the United States. Collectively these entities service states and regions that represent a substantial portion of national power consumption.

In areas served by RTO's/ISO's, FERC has required that in addition to managing the operation of the power grid, the RTO's and ISO's must manage the price of power generated and consumed on the grid using pricing principles that value the price of energy at the instantaneous intersection of supply and demand. To do this, the RTO's use pricing auctions. These price auctions, in addition to setting the price of electricity, must also obtain enough electricity production for the grid at the correct locations to ensure that the grid is capable of delivering adequate energy to the location of demand on the distribution grid. This process establishes the Locational Marginal Price ("LMP") for the next incremental energy production resource at a location.

In order to achieve these objectives the RTO employs a process know as Security Constrained Economic Dispatch. This process accepts generation offers in sequence from the lowest priced offer to the highest priced offer, up to an amount needed to satisfy load conditions. This economically efficient method is constrained, however, by the physical limitations of the grid to transmit power from where it is generated to where it is needed. Thus, if a low cost generating unit would be used based on price, but use of that unit would overload a transmission line and exceed its safe limits (for example, for voltage and thermal loading limits), then that unit will not be used. Instead, a more expensive unit which, due to its location, will not jeopardize the reliability of electric service, will be used. The first aspect of the process described above (the "economic dispatch") is achieved by a series of mathematical algorithms which choose the generating units to be dispatched so as to minimize production cost. Prices are then established on a locational basis with the prices in different locations reflecting the cost of the highest priced generator actually needed to provide service to a given location. The process of assuring locational prices uses a series of mathematical algorithms over energy management systems.

Historic Use of Load on the Grid

Historically, reliability of the grid was maintained by command and control measures under which the RTO could physically change the flow of energy on the grid if necessary to preserve reliability and avoid blackouts. Generation was increased or decreased as needed and load (demand) was presumed to be inflexible. This process did not rely upon price signals to maintain reliability. Therefore, it did not lead to economically efficient results while preserving reliability.

Today, grid operators recognize that load will respond to price signals and thus will pay consumers to curtail their consumption of electricity. This payment reflects the value that such curtailment provides to the grid in terms of enhanced reliability, and more efficient prices for electricity.

Market rules now permit customers to make offers to curtail their electricity use directly to the grid operator. These offers will be accepted so long as the price is lower than the competing offer by another resource, such as a generator. If accepted, the customer will curtail its use pursuant to the offer accepted by the grid and be paid accordingly.

This process enhances reliability by insuring that the grid is in continuous physical balance; that is, supply and demand are continuously matched. Moreover, it achieves this objective in the most economically efficient method possible, by accepting offers to curtail use when these offers are of lower cost than alternative means of maintaining balance (i.e., buying more supply). This mechanism benefits society as a whole by reducing the cost of electricity. And of course this process benefits individual customers by enabling them to control their individual electricity bills.

Policies in Favor of Reduction of Demand

Regulatory authorities and legislatures have begun to adopt policies intended to facilitate load control by customers (i.e., reduction of energy use by customers). These policies have been adopted in recognition of the fact that load control is in the public interest. For example, these policies provide compensation to customers who provide load control because load control reduces average prices, maintains reliability of the grid, and assists in meeting environmental objectives.

The price of electricity is set in the markets by the marginal cost, that is, the cost of the highest priced source which is needed to satisfy demand. More expensive sources are not used and are not paid. Demand reduction has the effect of reducing the amount of demand that must be satisfied and therefore reduces the price of electricity, as more expensive sources are not needed or called upon.

The price of electricity on wholesale markets changes every 15 minutes. That is, every 15 minutes different resources are used to satisfy demand, based on the economic dispatch described above.

Consequently, a need exists for improved systems to control and reduce electricity use by a customer, and to measure and price that reduction.

DESCRIPTION OF THE FIGURES

The features and advantages of embodiments of the present invention can be understood by reference to the following detailed description taken with the following figures of embodiments of the invention.

DESCRIPTION OF VARIOUS EMBODIMENTS

Figure 1:
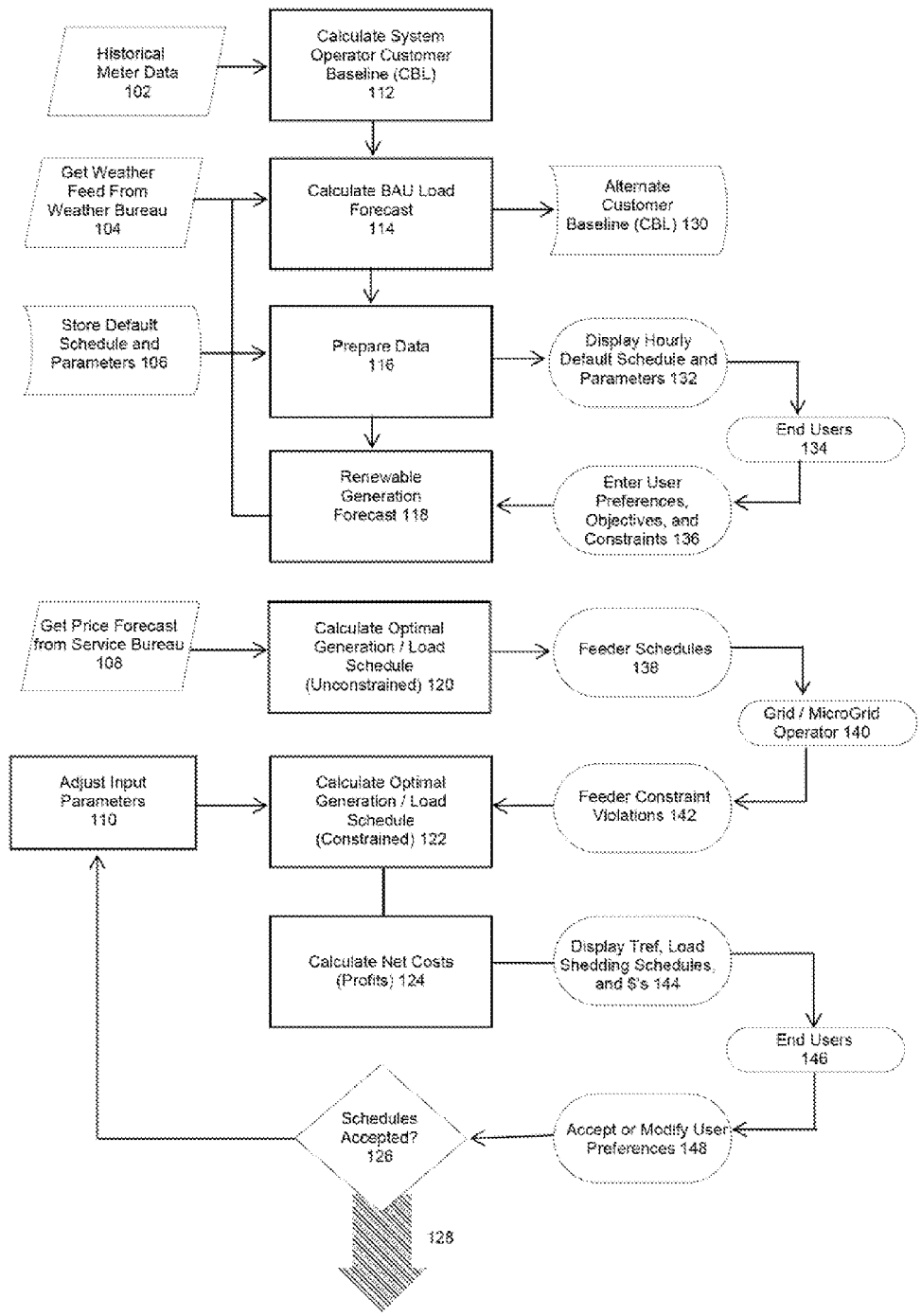
FIG. 1 shows an embodiment of a method of the present invention.

Embodiments of the present invention assist customers in managing the four types of energy assets, that is, energy generation, energy storage, energy usage, and energy load control assets. The customer is provided with information, options and operating schedules based on the algorithms herein, which allow the customer to maximize the economic return on his generation assets, his storage assets, and his load control assets. This process is referred to as optimization. Embodiments of the present invention focus on electric power and the use, consumption, production, distribution, demand, and load for electricity.

Embodiments of the present invention for the first time develop and predict a customer baseline ("CBL") usage of electricity, using a predictive model based on simulation of energy assets, based on business as usual ("BAU") of the customer's facility. This simulation approach is different from and more accurate than previous methods that merely used historical usage data at the customer account level from the customer's general electric meter, by statistical trend projection of this data.

Load control assets (also called controllable load assets) are assets that give a customer the ability to control the consumption of electricity by electricity-using devices. For example, a customer can control its use of electricity for air conditioning, lighting, or production processes, by use of variable frequency drive motors, smart thermostats, or other equipment. Load control assets may include types of energy generation, storage and usage assets. Load control assets may also refer to the energy management systems or building management systems which control operation of the electricity consuming devices.

Embodiments of the invention enable businesses to plan their energy consumption, and to plan their curtailments of energy consumption in response to price signals, such that the customer can optimize its use of electricity and earn revenue from the interstate electric grid by curtailing the user's consumption of electricity. Further embodiments relate to integrating customer-owned distributed resources including a customer's ability to curtail usage in response to price signals for energy generation, storage and consumption from the electric grid. Further, the invention enables the user to actively manage its electric load and to control its electric bill. Finally, the invention allows the user to optimize the financial value of its assets including storage, generation, consumption, and its ability to curtail consumption.

Embodiments of the present invention further the objective of maximizing economically efficient operation of the grid by facilitating demand reductions by customers in response to price. This is distinct from prior methods which would have curtailed usage via command and control of the grid by the RTO with no reference to price. The value of real time demand reduction for the electric grid is enhanced reliability, more efficient pricing and individual consumer value.

Embodiments of the present invention include a decision tool which will communicate price information and load control options to a customer several days in advance of the need to make a decision, and also in real time, so that the customer can make informed decisions regarding its consumption and load control possibilities.

Integration of optimized electricity resources and assets does not exist today. Embodiments of the present invention, in effect, convert demand into a controlled element of the grid.

Embodiments of the present invention permit the real time and day ahead integration of customer owned electricity resources onto the national and regional electric grids. As described above, the installation of these customer owned assets is expanding rapidly. However, there is at present no system which optimally deploys these resources. In contrast, the RTO's do employ mechanisms which optimally deploy utility owned generation.

Embodiments of the present invention fill a critical need in the nation's electric infrastructure by enabling customers to use their resources in the most economically advantageous manner. Embodiments of the invention turn controlled demand into a resource that the grid can rely upon and dispatch to maintain a physical balance of electricity supply and demand on the grid. Load is turned into a controllable element which can be called upon by the grid to adjust its behavior, rather than treated as an immutable fact which cannot be controlled.

Embodiments of the invention enable the grid to verify that the customer has taken action to control his load in response to price. This is important because payment should only be made for verified reductions in electricity use. This embodiment of the invention calculates the amount of energy that the customer would have consumed absent any reduction taken in response to price. Specifically, the embodiment models the usage of all the customer's electricity consuming devices, based on the customer's business as usual conditions. For example, the invention will model the customer's air conditioning usage based upon building thermal properties, ambient temperature and humidity conditions, and building occupancy. Similarly, the consumption of motors can be modeled based on the characteristics of the motors. This model of the expected consumption can then be compared to actual actions taken by the customer, and the resulting consumption levels, to verify that the customer has reduced consumption and is entitled to payment for the energy that was not consumed, but was normally expected to be consumed according to the modeling. This saved energy is sometimes called "negawatts" delivered to the grid (as opposed to "megawatts" used from the grid).

In one aspect, the invention may be a software networking device that converts resources (controllable load, generation, or storage devices) into an integrated system that uses a set of mathematical algorithms for pricing and payments that will vary based on the resource and requirements of the load and the assets in question.

Architecture of the Embodiments

The architecture of embodiments of the invention consists of several layers. At the core of the integrated system and processes is the software. The software receives several key inputs associated with the load and with conditions on the grid. Among the important inputs are ambient temperature and humidity, because these factors heavily influence the amount of electricity consumed in a building. Similarly, building occupancy is a key input for the same reason. If the resource being controlled is an industrial process, then the consumption characteristics of electricity consuming devices such as motors will be input to the software. Forecast electricity prices in the wholesale market are another important input.

The output of the software is an operating schedule for the end-users resources, i.e., his load consuming devices, his storage assets, and his generation assets. The output can best be described as an advanced decision making tool which takes all the inputs, and any operating constraints the customer must observe, and provides the customer with a schedule of operations for the next day which allows the customer to optimize the use of and return on his assets.

The output will be a schedule telling the customer what actions to take, and when to take them. For example, the system output may tell the customer to change the temperature setting in his building from 72 degrees to 74 degrees, and to do so between the hours of 4 P.M. and 6 P.M. Similarly, the output may tell the customer to start his diesel generator at 3 P.M. and run it until 5 P.M.

The next layer of the architecture is a communications system including interfaces by which Viridity Energy, Inc. ("Viridity"), conveys to the grid operator the schedule of operations of the customer for the next day. This is critical to the integration function because the grid operator must have accurate knowledge of the resources available to it so as to maintain a continuous balance between load and supply.

The next layer of the architecture involves the settlement or billing process. The system will provide an invoice to the grid operator, quantifying the reduction in load delivered by the customer reflecting the time of day of the reduction and the prevailing price at that time. The system will verify the billing amounts and handle settlements between the customer, Viridity, and the grid operator.

The next layer in the architecture involves the monitoring and verification of the actions taken by the customer to reduce load. This process requires the calculation of a customer base line, which can be defined as the quantity of electricity the customer will consume under business as usual conditions, that is, the consumption which will occur if the customer takes no action to reduce load in response to price. Embodiments of the invention perform this calculation based upon mathematical modeling of the electricity consumption which would occur in a given building or other electricity consuming device given the thermal and other key characteristics of the building or device. The algorithms which are used in the "baseline calculation" are discussed herein.

In accordance with embodiments of the invention, optimization of efficiency in the use of electric energy is achieved by a process that includes establishment of a mathematical simulation model of an energy-consuming facility. That model uses data concerning variations in the rates charged by the provider, and other data such as weather data, to control one or more electric energy consuming units in the facility.

More particularly, in accordance with embodiments of the invention, electric energy from a provider is delivered through a utility power grid to an energy-consuming facility having plural energy-consuming units. A mathematical model is established, representing the usage of electric energy by the energy-consuming facility. The model, which is independent of variations in the price charged by the electricity provider to the facility, is stored in a computer memory. On the basis of the mathematical model and variations in the price charged to the facility for electric energy, a computer is used to run multiple scenarios to determine a plan for controlling the operation of one or more of the facility's energy-consuming units to reduce the provider's overall charge to the facility for electric energy. Control signals are generated automatically, based on the plan, from electronic data derived from the computer operation. The control signals are then used to control one or more energy-consuming units so that their operation conforms to the plan.

The determination of a plan for controlling the operation of at least one of the facility's plural energy-consuming units can also be based on weather prediction data incorporated into the program.

The control signals can control the timing of the operation of one or more of the facility's plural energy-consuming units. For example, in the case of an air conditioner, the control signal can time the operation of the air conditioner so that it pre-cools the building that it serves during a time when the price of electric energy is low, e.g., at night, thereby reducing the consumption of electric energy during the day (when prices are high) and reducing the overall consumption of electric energy and the cost of energy to cool the building.

The process can be used, for example, where at least one of the facility's electric energy consuming units is an air conditioner.

If the facility includes an energy storage device and a solar generator, then the solar generator can be controlled by a control signal. For example, the control signal can cause the energy storage device to be charged by the solar generator during a time when the price of energy charged to the facility by the energy provider is below a predetermined level. A control signal automatically generated from electronic data derived from the program can also control the energy storage device to discharge stored electric energy to the utility power grid when the price of energy charged to the facility by the energy provider is above that predetermined level. A solar generator is always generating electricity, whenever there is natural light. The resulting power can be used to charge an energy storage device, or the power can be directly used by an energy-consuming facility. Embodiments of the invention allow the owner of these resources to make the optimal financial decision between these two choices.

Model of the Customer Baseline Usage

One aspect of embodiments of the invention is the establishment of a "customer baseline". The customer baseline is the level of a facility's consumption of electric energy on a given day, without regard to any action taken in response to price. That is, the customer baseline corresponds to the customer's energy consumption resulting from business-as-usual operation of its facility. Instead of relying on historical energy consumption data, the calculation of the customer baseline is based upon a computer simulation model of a facility's energy consumption, taking into account its operating plans. Thus, the calculation is predictive rather than backward-looking.

Figure 5:
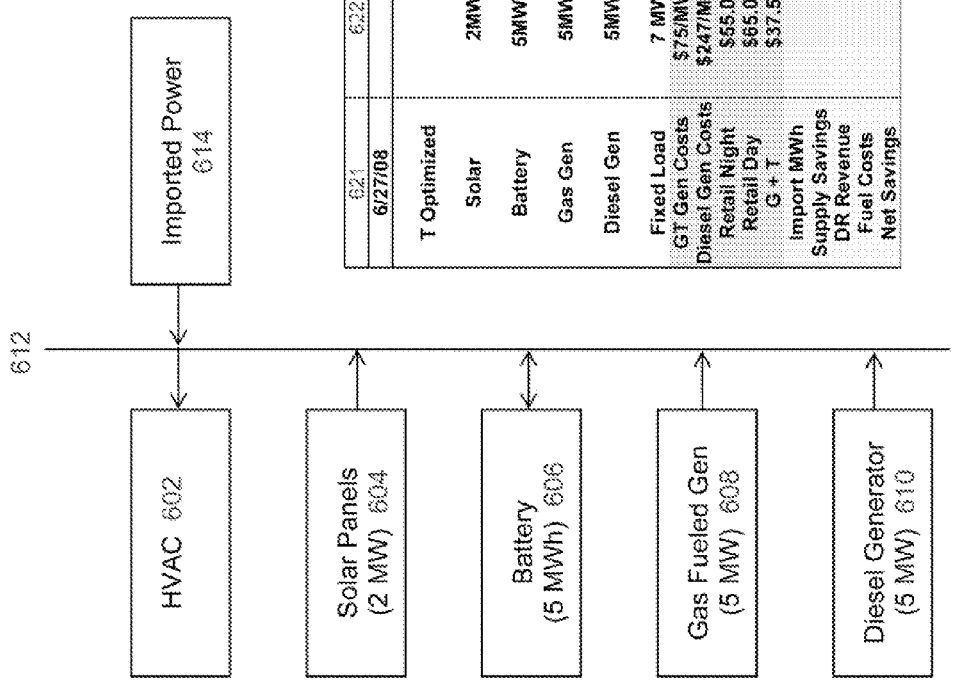
FIG. 5 shows an optimization example with optimization options and 4 cases, for an embodiment of the invention.

A mathematical simulation model is developed for each facility, taking into account the facility's energy consuming equipment and its operating plans shown as model builder module 502 in FIG. 5 herein. The calculation of consumption for each day may reflect all of the known relevant variables, such as building materials, thermal properties of the building or buildings, building occupancy, desired temperature, ambient temperature, and operations for the day. At least the following parameters may be included: HVAC building settings and controls, identification of interruptible loads and their pre-defined response to a price signal, desired temperatures. The software retains a record of the actual demand response action taken by an end-user.

Figure 4:
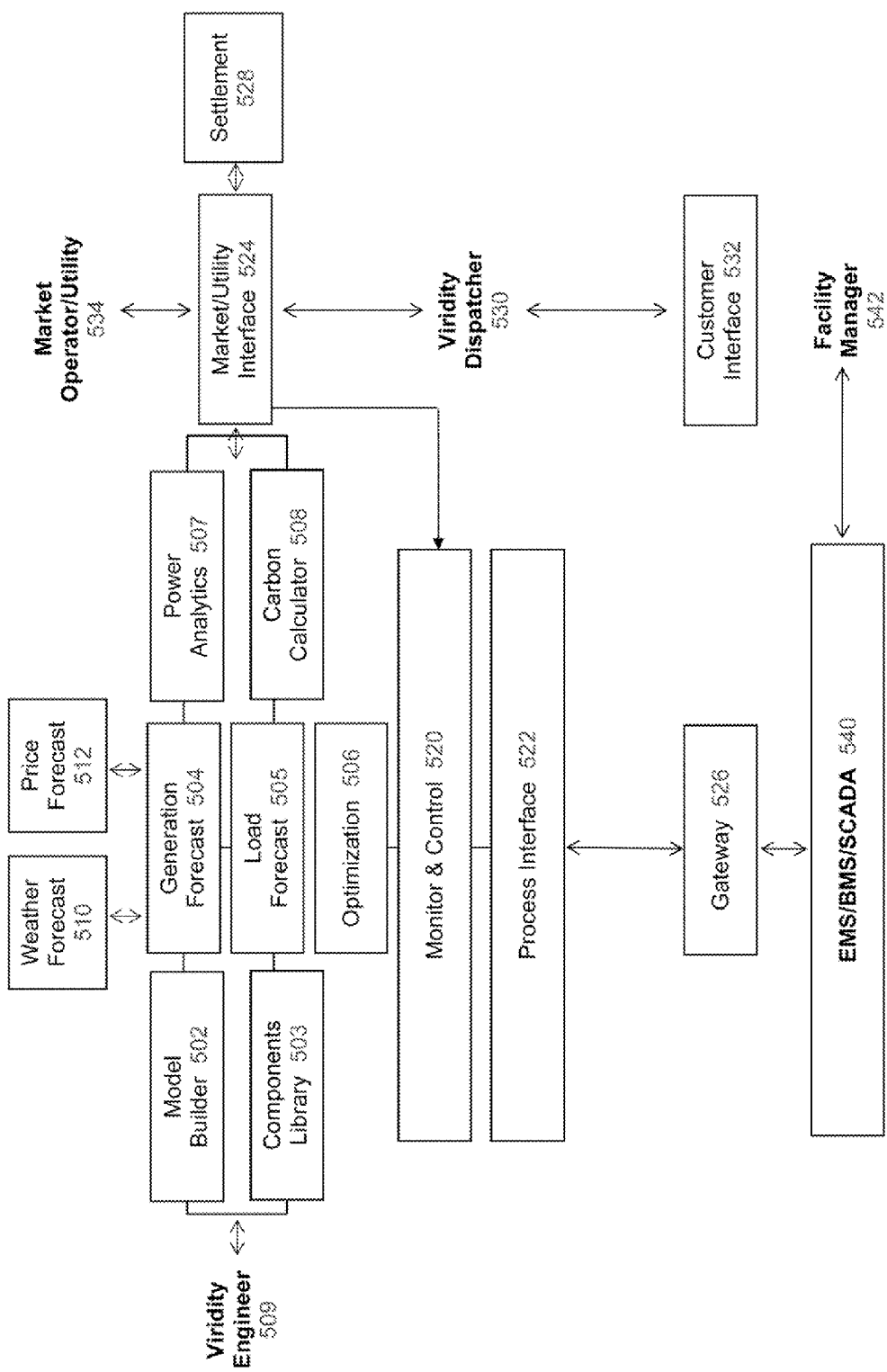
FIG. 4 shows system modules for embodiments of the invention.

The model for a facility can be composed of a group of sub-models of all the facility's energy-consuming elements, shown in components library 503, in FIG. 4 herein. The examples below refer to a building load, but the same method can be applied to any device, such as a motor or lighting fixture. Variable load as well as interruptible load equipment may be modeled specifically. Items constituting a fixed load may be measured and modeled individually.

Building thermodynamics is important in the determination of electrical loads. The fundamental thermodynamic equations for this application are:

$$CpM \frac{dT}{dt} = Q\_in + Q\_body - Q\_hvac - Q\_chill - Q\_vent \quad (1)$$

Where:
CpM=Energy-temperature change ratio.
Q_in=Energy inflow due to the difference between building internal temperature and ambient temperature.
Q_body=Energy emission from people and equipment in the building.
Q_hvac=Energy inflow from the HVAC in addition to the chiller and ventilation.
Q_chill=Energy inflow from the chiller.
Q_vent=Energy inflow from the ventilation system.

$$Q\_in = UA\_build \times (T^A - T^1) \quad (2)$$

Where:
Q_in=Energy inflow due to the difference between building internal temperature and ambient temperature.
UA_build=Heat energy transfer rate due to temperature differences.
$T^A$=Ambient temperature outside the building.
$T^1$=Internal temperature of the building.

$$Q\_body = Num\_people \times (Q\_per\_body + (equip\_rate \times Q\_equip)) \quad (3)$$

Where:
Q_per_body=Amount of energy emitted per hour from a person present in the building.
Num_people=Number of people present in the building.
equip_rate=Rate of personal electronic equipment per person.
Q_equip=Average amount of energy emitted by electronic equipment such as cell phones and computers.

$$Q\_hvac = \frac{u\_hvac}{k\_const} \times MaxQ\_hvac \times (T^1 - T\_cool) \quad (4)$$

Where:
Q_hvac=Energy inflow from the HVAC in addition to the chiller and ventilation.
u_hvac=HVAC loading.
MaxQ_hvac=Maximum thermal production capacity of the HVAC.
T_cool: =Defines the threshold temperature below which the HVAC system operates in heating mode, while above which it operates in cooling mode.

$T^1$=Internal temperature of the building.
k_const=Constant parameter.

$$Q\_vent = MaxQ\_vent \times U\_vent \quad (5)$$

Where:
Q_vent=Energy inflow from the ventilation system.
u_vent=HVAC ventilation loading.
MaxQ_vent=Maximum thermal production capacity of the HVAC ventilation.

$$Q\_chill = \frac{u\_chill}{k\_const} \times MaxQ\_chill \times (T^1 - T\_cool) + u\_dice \times Ice\_drate \times Btu\_MWh\_ConvRate \quad (6)$$

Where:
Q_chill=Energy inflow from the chiller.
u_chill=HVAC chiller loading.
u_dice=Cooling use of stored ice.
MaxQ_chill=Maximum thermal production capacity of the HVAC chiller.
Ice_drate=Chiller's ice-consuming rate when the stored ice is to be used (discharge).
$T^1$=Internal temperature of the building.
k_const=Constant parameter.
Btu_MWh_ConvRate=Conversion coefficient of electric to heat energy.
T_cool=Defines the threshold temperature below which the HVAC system operates in heating mode, while above which it operates in cooling mode.

The thermodynamic equations are related to electrical load through the following equations.

$$MW\_hvac = \frac{MaxQ\_hvac}{Eff\_hvac \times Btu\_mWh\_ConvRate} \times u\_hvac \quad (7)$$

Where:
MW_hvac=Average HVAC power consumption.
Eff_hvac=Efficiency coefficient of HVAC thermal energy production by electric energy.
Btu_Mwh_ConvRate=Conversion coefficient of electric to heat energy.
MaxQ_hvac=Maximum thermal production capacity of the HVAC.
U_hac=HVAC loading.

$$MW\_vent = \frac{MaxQ\_vent}{Eff\_vent \times Btu\_mWh\_ConvRate} \times u\_vent \quad (8)$$

Where:
MW_vent: =Average ventilation power consumption.
MaxQ_vent=Maximum thermal production capacity of the HVAC ventilation.
Eff_vent=Efficiency coefficient of HVAC thermal energy production by electric energy.
Btu_MWh_ConvRate=Conversion coefficient of electric to heat energy.

$$MW\_chill = \frac{MaxQ\_chill}{Eff\_chill \times Btu\_mWh\_ConvRate} \times u\_chill + u\_cice \times Ice\_crate \quad (9)$$

Where:

MW_chill=Average chiller power consumption.

MaxQ_chill=Maximum thermal production capacity of the HVAC chiller.

Eff_chill=Efficiency coefficient of the HVAC chiller.

u_cice=Ice-making operation.

Ice_crate=Chiller's ice-making rate when making ice (charge).

u_chill=HVAC chiller loading.

Btu_MWh_ConvRate=Conversion coefficient of electric to heat energy.

$$Load\_hvac = MW\_hvac + MW\_vent + MW\_chill \quad (10)$$

Where:

Load_hvac=Total electric power to operate the HVAC system.

MW_hvac=Average HVAC power consumption.

MW_vent=Average ventilation power consumption.

MW_chill=Average chiller power consumption.

The variables Num_people and equip_rate in equation (3) are determined from occupancy data and facility or industry data concerning the number and types of electronic equipment per person. MaxQ_hvac, MaxQ_chill, and MaxQ_vent, can be determined from equipment name plate data.

The model established for an energy-consuming facility, and the sub-models for related equipment may take into account the above thermodynamic load equations.

There is a wide variety of other types of variable load and interruptible load equipment that can be accurately modeled using a similar approach. The granularity of these models will be that necessary for accurate calculation of the business as usual load of a facility as measured against the metered load. Sub-metering can be used as necessary to validate mathematical models of variable and interruptible loads.

For large scale facilities consisting of multiple buildings or elements, the total customer base line load is simply the sum of the base line loads for the individually-modeled aggregated elements.

The process for developing the model of a facility is iterative. A generic, or representative, model of the facility is first developed. Experiments are then performed on the building or buildings to determine their thermal parameters. Sub-metering is used as previously mentioned. The experimental results and load data are incorporated to modify and tune the generic model.

After the model is created, it is validated by conducing simulations of the facility using the model to calculate the electrical load. Model output is compared to actual historical metered loads. Further experimentation, data collection, and model refinement is performed until the model accurately reproduces metered data.

A model can include various types of local energy generation devices such as diesel, combined cycle, solar, and wind-powered devices, as well as any energy storage devices such as ice makers, chilled water reservoirs, batteries, and flywheels. The model can also include the hourly energy required to store energy, time-variant losses of energy, and delayed use of stored energy for cooling, heating or conversion to electricity.

A simple type of conversion to consider is a battery system. Energy is purchased and stored during off-peak periods during which it can be purchased at lower rates. The stored energy is withdrawn during peak hours (when prices are high), providing a corresponding decrease in the facility's energy requirements during those hours. The withdrawn, on-peak energy is a demand response event, and the net decrease in energy use can be offered into the market and be compensated for as a demand response product. The stored energy is used by the facility in place of utility-supplied energy when it is cheaper to use the stored energy. The stored energy is added to the utility-supplied energy, and any excess stored energy over what is actually used can also be sold back to the grid.

In the case of energy storage using a battery, embodiments of the process according to the invention optimize the use of the battery to provide the best economic result, including increased off peak usage, decreased on-peak usage, and receipt of payments for verifiable actions based on Locational Marginal Prices ("LMPs").

As an example, a facility may include a building having a heating, ventilating and air-conditioning system (HVAC), as well as various other electric energy-consuming devices represented by other loads. These other loads can be, for example, lighting, electric motors, industrial heating equipment, refrigeration equipment, pumps, elevators, and electronic equipment. Use of all of these devices can be optimized such that the total electric bill is minimized.

The facility may also include its own solar collector (or solar generator), and a storage battery, connectible to the solar collector through a switch. The storage battery may be switched from the solar collector to an inverter, which can convert the direct current from the battery to alternating current synchronized with 60 Hz electric current delivered to the facility through a local power line, which is connected to a utility grid through a transformer. Operation of the battery and solar generator can be co-optimized so as to maximize the return on both of these assets, based upon the inputs and operating schedule developed by embodiments of the invention.

A dispatch center, which includes computers and a computer memory, in communication with a controller at the facility through a communication network, and can send instructions such as set forth below.

An example of embodiments of the present inventions for managing energy at a facility may include the following scenario: First, according to a model of the facility, the interior temperature of the building may be normally set at 72° F. during ordinary business hours, i.e., 7:00 AM to 5:00 PM. At night, however, when the building is not in use, its interior temperature can be allowed to rise to 80° F.

Assume that the facility operator agrees that, during the hours from 10:30 AM to 5:00 PM, the interior temperature within the building may be allowed to rise to only 75° F. rather than 80° F. By doing this, the operator can reduce the building's energy bill.

In the example, the program, looking ahead at the weather prediction for the next day, and having stored in its memory not only the facility model and current information on energy rates, but also the information that 75° F. is an acceptable working hour temperature, determines that the least expensive way to maintain the desired working hour temperature is to pre-cool the building during a time between midnight and 7:00 AM, when energy rates are lower than they are during the day. Pre-cooling can reduce the building temperature to 73° F., which is somewhat lower than the desired 75° F. temperature using lower-cost electric energy, and reduce the consumption of energy during the day, thereby reducing the net cost of energy consumed over a full day.

The net cost of energy can be reduced in an exemplary scenario. In the scenario, the ambient outside temperature varies from 90° F. at 6:00 PM to 80° F. at 6:00 AM. The ordinary operation of the HVAC system is without control by the computer at the dispatch center. It is assumed that 75° F. is an acceptable daytime temperature. The interior temperature is allowed to rise at night from 75° F. to 80° F. In the morning, soon after the interior temperature reaches 80° F., the HVAC unit switches on, and begins to reduce the temperature to a level slightly below 75° F. using electric energy at the daytime rate during an interval from T1 to T2. During the day, the HVAC unit switches on and off continually, maintaining the interior temperature within a relatively narrow temperature band averaging 75° F. Assuming that the power consumption of the HVAC unit is constant, the cost of energy consumed is proportional to the energy rate multiplied by the aggregate on-time of the HVAC unit.

In the example case where the off-site computer calls for pre-cooling, it determines when pre-cooling should commence based on the current interior temperature, the current ambient temperature, and the weather prediction for the next day. Pre-cooling commences at time T3, e.g., at approximately 4:00 AM, and continues until time T4, at which point the interior building temperature is close to and approaching 73° F. The HVAC unit switches on and off during the day to maintain a 75° F. temperature. The aggregate on-time of the HVAC unit during the day is less than the aggregate on-time in the absence of external control. The total cost of electric energy for the HVAC unit during the 24 hour interval from 6 PM to 6 PM the next day can be lower, because the cost of electric energy is low from time T3 to time T4.

The computer at the dispatch center can also cause the controller to charge the battery from the grid power or from the solar collector when the prices are low and discharge the battery to the grid when prices are high. The computer can also cause the solar collector to sell its power to the grid when this is more economical than using the solar collector to charge the battery.

FIG. 1 shows an embodiment of a method of the present invention. Historical data 102 from a customer's facility is inputted into the system to calculate the RTO system operator's estimate of the customer baseline (CBL) 112 usage of electrical energy. This is the historically expected customer use of electricity, if the energy optimization of the present invention is not applied, or calculated by the RTO operator. This CBL calculation 112 is inputted to the system to calculate a BAU (business as usual) electrical energy forecast 114 for the facility, which forecasts the energy usage if the energy management of the present system is not used. Alternatively, an alternate customer baseline 130 may be calculated, by the user of the present invention, in place of the RTO system operator's calculation of the customer baseline 112, to be used for the BAU load forecast 114. The system prepares data 116 so that the system may display an hourly default schedule and parameters 132 based on the CBL. This default schedule 132 is then transmitted to the end user's of electricity at facilities 134. The end user 134 preferences, objectives and constraints 136 for their energy use are then input. These user preferences, objectives and constraints 136 together with the data 116 from the CBL and BAU load forecasts 112, 114 and the resulting data 116 are used to generate a renewable energy forecast 118. This renewable energy forecast 118 can then be recycled to calculate an updated BAU load forecast 114.

The system also obtains a weather feed from the weather bureau 104 for input into the calculation of the BAU load forecast 114.

The system also stores a default schedule and parameters 106 for the preparation of data 116, as needed.

Embodiments of the invention may also obtain price forecasts from a service bureau 108 to inform the calculation of an optimal generation/load schedule (unconstrained) 120. These schedules 120 are used to develop feeder schedules 138, which are delivered to the RTO grid and facilities micro grid operators 140. The operator 140 then provides a feeder constraint or violations analysis 142 which is used by the system to calculate an optimal generation/load schedule (constrained) 122. This schedule 122 is then used to calculate net costs (profits) 124 for application by embodiments of the system. These net costs and profits 124 then are used to display the TREF (reference, temperature, i.e. the target temperature for the facility, load shedding schedule and prices 144. These displays are then available to the end users of the electricity and of the system 146. The end users 146 may then accept or modify the user's preferences 148. These schedules may be accepted 126 and those accepted schedules are transmitted 128 to the next step and used to calculate a day ahead virtual generation schedule 210, as shown as FIG. 2. If the schedules are not accepted 126, then the input parameters are adjusted 110, and recalculation is performed on the optimal generation/load schedules (constrained) 122, and the process is reiterated until all schedules are accepted at 126 and transmitted at 128 to calculate a day ahead virtual generation schedule 210.

Figure 2:
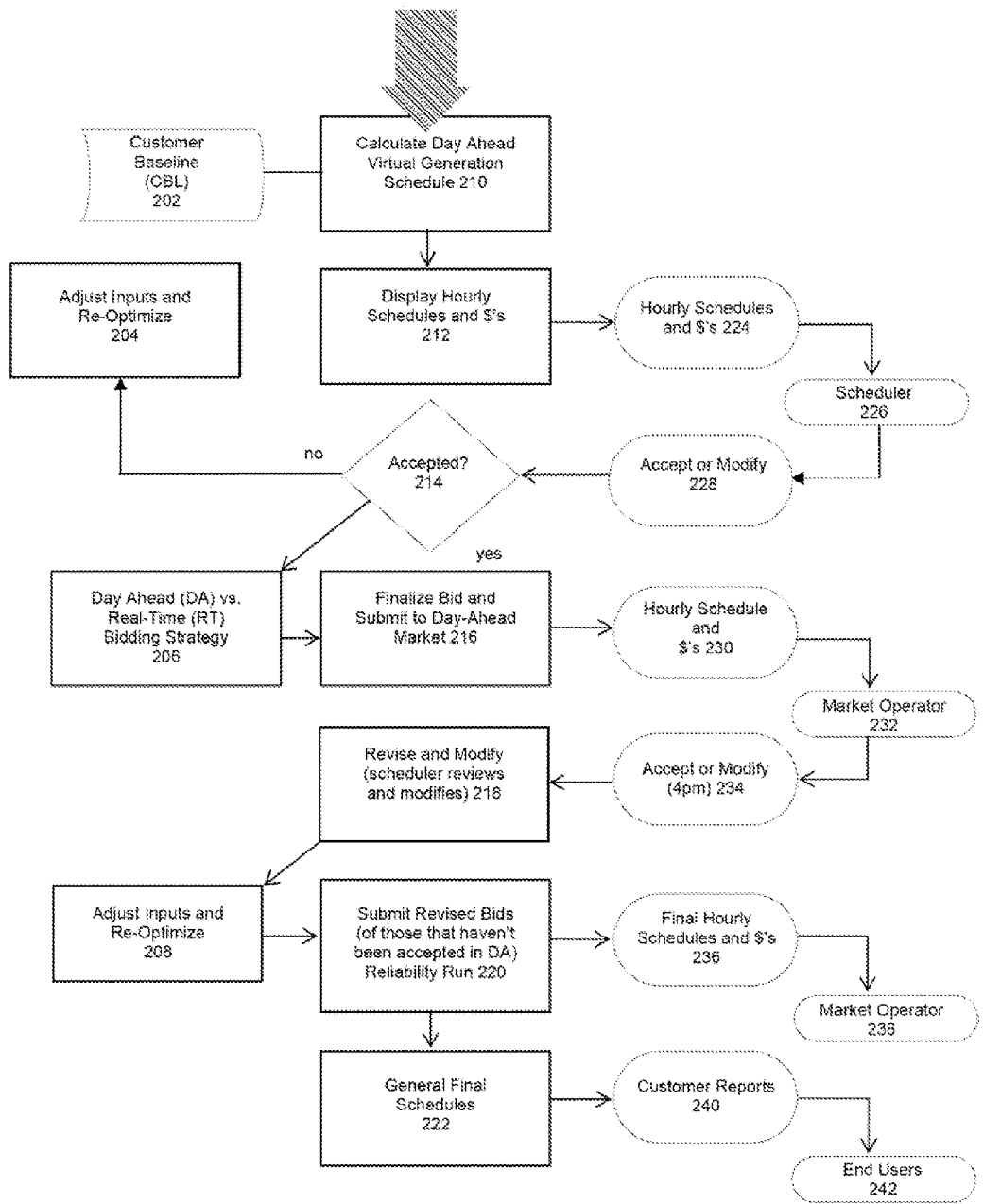
FIG. 2 shows further embodiments of a method of the present invention.

FIG. 2 shows further embodiments of a method of the present invention. Customer baseline CBL 202 is used to calculate the day ahead virtual generation schedule 210, which also uses the accepted schedules 126. This schedule data is then used to display hourly schedules, prices and costs for the facility 212. The schedules 212 are used to show hourly schedules, or other time period breakdowns, and prices and costs 224, which are transmitted to scheduler 226. Scheduler 226 may accept or modify these schedules and prices 228. If the prices are accepted 214, then day ahead (DA) versus real-time (RT) bidding strategy 206 is developed. If the schedules 224 are not accepted 214, then the system adjusts inputs and reoptimizes the schedule at 204, to recalculate the day ahead virtual generation schedule 210 and the process is reiterated until the schedules 224 are accepted at 214. The bidding strategy 206 results in a final bid and submission to the day ahead market 216. This generates a bid that is broken down by hourly, or other time period, schedules and prices 230, and sent to a market operator 232. The market operator 232 may accept or modify (by 4 PM) the finalized bid 216, at 234. The system may then revise or modify (scheduler reviews and modifies) 218 the accepted or modified bids. The system may adjust inputs and reoptimize the schedules in 208, if necessary. A reliability run for revised bids may be submitted 220 (those bids that have not been accepted in the day ahead). These revised bids may result in revised hourly schedules and prices 236, and then they are resubmitted to the market operator 238. This may result in generation of final schedules 222, which results in a generation of consumer reports 240 that are delivered to the end users of electricity 242.

Figure 3:
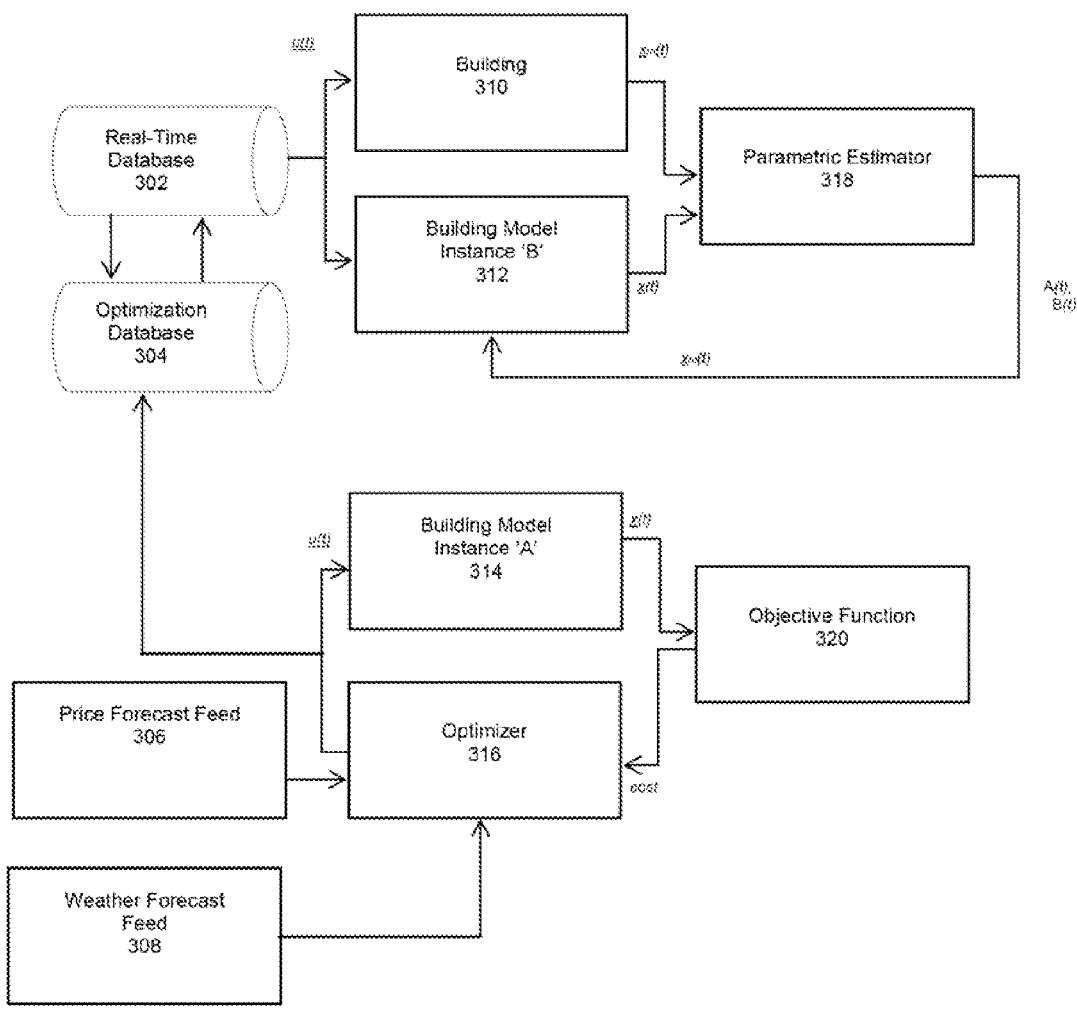
FIG. 3 shows a general overview of an embodiment of one possible algorithm of the present invention.

FIG. 3 shows a general overview of an embodiment of one possible algorithm of the present invention, to predict the customer baseline ("CBL") load using parametric estimation. In general, complex processes are often described by non-linear equations, which present a challenge to the most advanced optimization engines. The objective of the embodiment is to provide an accurate CBL model represented by linearized equations, where the coefficients of the linearized equations are adjusted in real-time from actual process measurements, using parametric estimation. This method may provide an accurate load forecast, with minimal effort necessary to deploy the solution. In addition, the model may be adapted over time to physical changes in the building, such as efficiency improvements.

Module 314 contains the linearized simulation model (Instance 'A') of the CBL load. The optimization engine (Module 316) will iterate on the control vector u(t) which represents the control variables (e.g., temperature control), and Module 314 will compute the corresponding state vector x(t), which represents the process variables (e.g., temperature, humidity) over time, taking into account various inputs such as the weather forecast parameters (Module 308) and Price Forecast Feed 306. The optimization engine (Module 316) iterates on the control vector u(t) until the objective function (Module 320) is optimized over the defined time period (e.g., next 24 hours). The objective function combines several user adjustable components that include such factors as comfort, economic benefit and environmental objectives, along with various time dependent constraints on both state and control variables. Economic benefits are derived from known time dependent economic parameters, including the wholesale price forecast (Module 308). The solution is stored in the Optimization Database (Module 304), which contains various optimization scenarios or cases that can be simulated and compared by the end user. Once a case is selected, the user will then commit the specific scenario to the Real-Time Database (Module 302).

The selected control vector u(t) may then be used by the Building Management System to control the corresponding physical resources as a function of time. The same control vector is submitted in parallel to the Module 312, which contains an identical version of the Building Model (Instance 'B'). The output of Module 312, the simulated state of the building x(t), is compared against the measured state xm(t), which is produced by the Building Management System 310. The difference is fed to the Parametric Estimator (Module 318) which calculates, by doing parametric estimation (e.g., using Kalman filters), the model coefficients A(t) and B(t) that minimize the difference between the simulated state and the observed state of the building. These coefficients are updated periodically to ensure that the linearized model used for the optimization (Module 314) forecasts accurately the time dependent simulated behavior of the building in the vicinity of the current measured state.

FIG. 4 describes VPower system modules for embodiments of the present invention. Each module may be a software module executed on hardware. The modules are in electronic communication with each other as shown in FIG. 4 to operate in the system.

Model builder module 502 models a particular client facility such as a building or office campus. The energy resources modeled may include the building, the lights, HVAC, motors, electricity generation capacity, generators, and solar generators, for example. The model builder module 502 and other technical elements 502 through 542 shown in FIG. 4 may variously run as software on PCs or other appropriate computer facilities.

The components library 503 may be a library of software components to model particular genres of facilities or energy resources, such as buildings, HVAC and motors, which components 503 may be calibrated with specific parameters for specific clients.

The generation forecast module 504 receives weather forecast information from the weather forecast module 510, and receives electricity price forecasts and related price forecasts, from the price forecast module 512. The generation forecast module 504 then generates for the customer a forecast of the customer's electricity generation, for example from solar or diesel generation.

The load forecast module 505 generates a forecast of load for a specific facility, that is a forecast of the electricity demand used by the customer's facility, broken down for time periods over the day, for example, in half hour increments.

The optimization module 506 produces optimum options for the individual customer, presenting tradeoffs for optimizing different parameters, such as the total cost of electricity versus comfort from the maintained temperature. For example, there is a tradeoff in the summer months between the cool temperature generated within a facility by HVAC and the energy costs to generate the same.

The power analytics module 507 analyses a micro electric grid (e.g. for a campus or a large building for a customer), and maintains acceptable power quality within the forecasts and optimizations, for example maintaining required voltage and amps within acceptable tolerances.

The carbon calculator module 508 calculates how much the system options presented by optimization module 506 may each reduce the carbon footprint of the client system.

The Viridity engineer 509 communicates with the various modules of the system 502 through 508 to develop the forecasts and other output on a daily basis, perhaps disaggregated by hourly or lesser time periods.

The modules 502, 503, 504, 505, 506, 507 and 508 communicate with each other in the system and with the Viridity engineer 509 in the optimization mode of the system to develop and analyze optimization options for the target client facility.

The weather forecast module 510 provides data which is purchased from outside vendors and the data is imported to the generation forecast module 504.

The price forecast module 512 also provides data bought from outside vendors to import price forecast data to the generation forecast module 504.

The monitor and control module 520 monitors the client's facilities to determine if the customer actually operates facilities in the manner of the chosen option and also communicates with the grid operator 524. The monitor and control module 520 also can be used to remotely control the client's facility 540, if authorized, and if in electronic communication with the client's facility 540.

The process interface module 522 is similar to a communication API in electronic communication between the monitor and control module 520 and the gateway 526.

Gateway 526 is a gateway in electronic communication with the EMS/BMS SCADA module 540. The energy management system ("EMS"), and the building management system ("BMS"), and the supervisory control and data acquisition ("SCADA") system are legacy systems installed in the customer's facilities that communicate through the gateway 526 to their process interface module 522 and to the modules 502 through 508 of the VPower system. The EMS/BMS SCADA module 540 communicates through the gateway 526 to the process interface 522 through a variety of possible communication links including, e.g., the Internet, which links may include a virtual private network ("VPN").

The facility manager 542 communicates with and controls the EMS/BMS SCADA module 540 through communication through his computer system.

The market/utility interface module 524 communicates with the carbon calculator 508 and the other VPower system modules and the monitoring and control module 520. Furthermore the market/utility interface 524 communicates with the market operating/utility 534 and the Viridity dispatcher 530. The Viridity dispatcher 530 communicates with the customer interface module 532. The customer interface module 532 permits the Viridity dispatcher 530 to communicate with the customer facility manager 542.

The facilities manager 542 offers to produce power at a price, or to control load to an extent. If this is accepted by the market operator/utility 534 at a particular price, then the facility 540 must consequently perform accordingly.

The market/utility interface 524 is similar to an API that communicates between the VPower system modules 502 through 508, and the market operator/utility 534, and the settlement module 528. The market/utility interface 524 communicates to the grid operator 534 that the Viridity dispatcher 530 makes an offer to the operator 534 on behalf of the facility manager 542 to produce electricity at a price and a time and a quantity, or to reduce consumption from the CBL (consumer base line) in a certain amount at a certain time. The operator 534 may then accept that offer. This information is then transmitted to the settlement module 528 to monitor specific performance by the facility 540 to produce electricity or reduce consumption from the CBL as agreed, and to arrange billing and payment accordingly between the market operator 534 and the facility manager 542.

The monitor and control module 520, the process interface module 522, the gateway 526, the market/utility interface 524, the settlement module 528, and the customer interface 532 are part of the real-time mode operation of the system. In the real-time mode, these modules monitor and control what the facility is actually doing, and also inform the facility manager 542 and the Viridity dispatcher 530 of sudden changes in prices that may lead to an alteration of the optimization schedule.

The weather forecast module 510 and the price forecast module 512 are owned and operated by third parties. The EMS/BMS/SCADA module 540 is owned and operated by the customer. The optimization mode modules 502-508 are owned and operated by Viridity, as are the modules 520 and 522.

The Viridity engineer 509, weather forecast module 510, price forecast module 534, market/utility interface 524, settlement module 528, Viridity dispatcher 530, customer interface 532, facility manager 542, EMS/BMS/SCADA 540, and gateway 526, may communicate with the system 502, 503, 504, 505, 506, 507, 508, 520, 522 and with each other through the Internet, wirelessly, by leased lines, POTS, VPN, or other telecom links.

FIG. 5 shows an example of the VPower optimization mode output. Electricity energy consumption and production features of a customer's facilities are shown, such as HVAC 602, solar panels (2 megawatts) 604, battery (5 megawatt hours) 606, gas fueled generator (5 megawatts) 608, and diesel generator (5 megawatts) 610. These resources 602 through 610 integrate over the power grid 612 with the larger RTO power grid which is a source of imported power 614. Here the term "imported power" means electric power from the RTO brought into the customer's facility over the power grid 612.

Various optimization options, produced by the optimization module 506 in FIG. 4, are shown in FIG. 5 in columns 621, 622, 623, 624, 625 and 626, and rows 630 through 646. Column 621 shows various row titles including the date row 630, temperature optimization in row 631, various power production and consumption facilities in rows 632 through 636, being respectively solar, battery, gas generation, diesel generation, and fixed load (fixed power consumption or fixed demand).

Row 637 shows gas generation cost for the customer, and row 638 shows diesel generation costs by the customer. Line 639 shows the retail night cost of electricity from the customers supplier, and line 640 shows the retail day cost of electricity from the supplier. Line 641 shows the generation and transmission costs reflected in retail rates.

Line 642 shows the megawatt hours of imported electricity from the grid to the facility under different optimization scenarios. Line 643 shows the supply cost savings. Line 644 shows the demand response (reduced demand) revenue, i.e. the revenue paid to the facility operator by the RTO for the facility generator's reduction in the facility's energy usage below the CBL. Line 645 shows the fuel costs applicable and line 646 shows the net savings for the cases illustrated in the optimization examples.

Column 622 shows various units and prices for the respective items in column 621. MW abbreviates megawatts. MWH abbreviates megawatt hours.

Line 630 through 636, in column 622, shows the production capacity of the respective facilities. Lines 637 through 641 of column 622 shows the prices of the various factors named in column 621.

The checkmarks in lines 631 through 636 in cases 0 through 3 in columns 623 through 626 indicate what options are active in the indicated optimization case. Lines 637 through 646 in columns 623 through 626 show the various indicated prices and costs of the various features and options selected in the various cases. Line 646 shows the financial benefit of each option.

For example, in column 626 in optimization case 3 produced by embodiments of the invention, temperature is optimized, and all five of the energy resources including a solar, battery, gas generation, diesel generation and fixed load are implicated. The applicable prices are indicated in lines 637 through 641. The result in 642 is importing 63.64 megawatt hours of electricity from the grid (rather than the 226.64 MWH in Case 0), with a supply savings of $9,893.02 in line 643, with demand reduction reimbursement from the grid to the facility in line 644 of $21,376.18, with a fuel cost to the facility in line 645 of $12,092.02, for a net savings to the customer in case 3 of $19,177.18 shown in line 646. Of the four cases shown in this FIG. 5, the highest net savings in line 46 is with case 3, which is thereby indicated as the most optimizing case.

Figure 6:
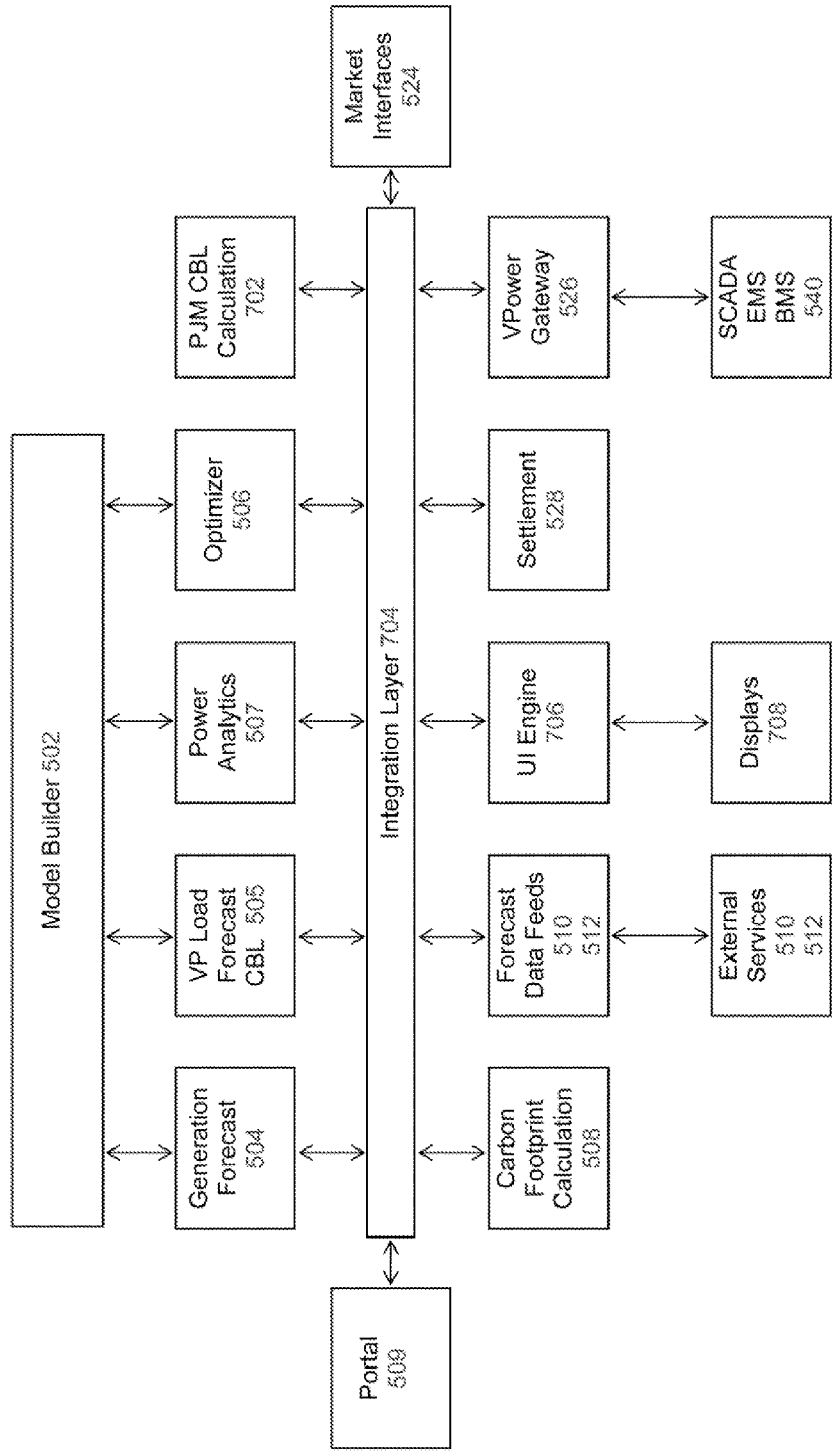
FIG. 6 shows system architecture for embodiments of the invention that support and implement the system modules as shown in FIG. 4, and produce optimization examples and options as shown in FIG. 5.

FIG. 6 shows the VPower system architecture for embodiments of the invention that support and implement the modules shown in FIG. 4 to produce the optimization example shown in FIG. 5. Appropriate computer and communications hardware and software is used in an integration layer 704 to permit integrated communication between the portal 509, generation forecast module 504, the VP (VPower) load forecast CBL 505 (the VPower load forecast of the "customer base load"), the power analytics module 507, the optimizing module 506, the model builder 502, the market interface 524, the VPower gateway 526, the settlement module 528, the forecast data feeds 510, 512 from the external services 510, 512, and the carbon footprint calculator 508. (The same element numbers are used in FIG. 6 and FIG. 4, where the same elements are referred to in both Figures.)

Furthermore, the integration layer 704 allows integrated communication between these components and the PJM CBL calculator 702, the user interface engine 706, the displays 708, and the SCADA, EMS, BMS, 540. CBL abbreviates "customer base load" for electric power and is discussed further herein. The PJM CBL calculator 702 is a CBL calculator provided by a specific RTO in the Northeast, that being PJM.

The VP load forecast CBL 505 is referred to in FIG. 4 as the load forecast module 505. This is an alternative forecast of the CBL by a VPower embodiment of the invention. The PJM CBL calculator 702 may be used initially to forecast the CBL. However, it may be that the alternative VP load forecast CBL 505 provides a superior algorithm and may eventually replace use of the PJM CBL calculator 702 to forecast the CBL. The system as indicated in FIG. 6 may use either or both alternative CBL calculations 505, 702, to support the settlement module 528.

Figure 7:
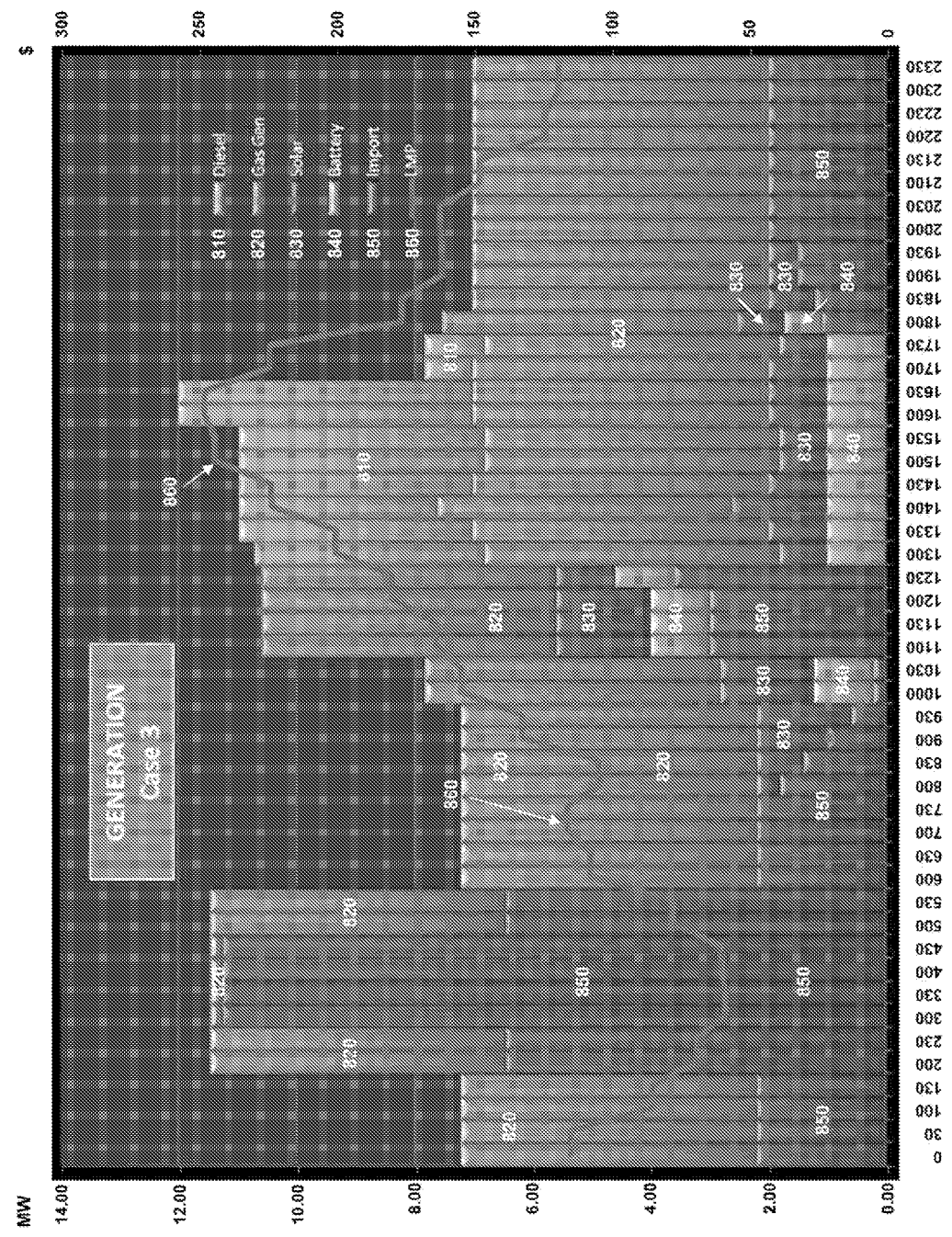
FIG. 7 shows power use and price information for various electric energy resources in an optimization case example over a 24-hour cycle as generated by system modules and architecture as shown in FIG. 4, FIG. 5, and FIG. 6.

The portal 509 is used by the Viridity engineer of 509 as indicated in FIG. 7 to access the embodiment.

The UI engine 706 may develop, project and support the user interfaces 708 used by the Viridity engineer 509, the Viridity dispatcher 530, the facility manager 542, and by the market operator utility 534. The UI engine 706 projects the displays 708 used by the various users.

FIG. 7 is a chart describing the operation of one possible optimization option that may be calculated by system modules of FIG. 4 through the optimization examples in case 3 in FIG. 5 shown in column 626, using the system architecture of FIG. 6.

The horizontal axis shows time over a 24-hour cycle in 30-minute intervals. The vertical axis on the left-hand scale shows megawatts, the vertical axis on the right-hand scale shows cost in dollars. The different vertical bars show the production of electricity by a facility in option 3 at various times during the day, produced by diesel generation 810, gas generation 820, solar generation 830, power battery discharge 840, imported electricity from the RTO power grid 850, and the locational marginal price (LMP) throughout the day is shown in the line 860. Hence, we can see that under this optimization scenario, for example electricity imported from the grid 850 is maximized during the hours around 3:30 a.m. when the LMP is the lowest, and the electricity imported from the grid 850 is reduced to zero during the hours around 15:00 hours when the LMP is highest.

Also, it appears that the facility may be pre-cooled during the time around 3:30 hours when the LMP is lowest, by a substantial use of imported electricity.

Also, is appears that total use of electricity is peaked again in the hours around 15:00 hours when the demand for cooling is highest in the afternoon. But at this time, imported power 850 is reduced to zero because the LMP 860 is most expensive. This is accomplished by using diesel generation 810, gas generation 820, solar generation 830 (which is possible because the sun is out), and discharging the batteries 840. The batteries have been charged during the night around 3:30 hours when the LMP is lowest, to be discharged in the afternoon when the LMP is highest.

In a similar manner, FIG. 7 shows the optimized use of each of the energy resources throughout the 24-hour cycle.

Other Matters

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless or wireline varieties thereof, or any other computerized device capable of configuration for receiving, storing or processing data for standalone application or over a networked medium or media.

Computers and computer systems described herein may include operatively associated non-transitory computer-readable memory media such as memory for storing software applications used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD compact disc, memory stick, ROM (read only memory), RAM (random access memory), PROM (programmable ROM), EEPROM (extended erasable PROM), or other like computer-readable media.

In general, non-transitory computer-readable memory media may include any medium capable of storage of an electronic signal representative of data stored, communicated or processed in accordance with embodiments of the present invention. Where applicable, method steps described herein may be embodied or executed as instructions stored on a non-transitory computer-readable memory medium or media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as constriction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, or parts may be made within the principle and scope of the invention without departing from the invention as described in the following claims.

Various components of embodiments of the invention may be implemented as software code to be executed by a processor of any computer system using any type of suitable computer instruction type. The software code may be stored as a series of instructions or commands on a non-transitory computer readable memory medium. The term "non-transitory computer-readable memory medium" as used herein may include, for example, magnetic and optical memory devices such as diskettes, compact discs of both read-only and writeable varieties, optical disk drives, and hard disk drives. A non-transitory computer-readable memory medium may also include memory storage that can be physical, virtual, permanent, temporary, semi-permanent or semi-temporary.

The methods may be implemented by any suitable type of hardware (e.g., device, computer, computer system, equipment, component), software (e.g., program, application, instruction set, code), storage medium (e.g., disk, device), propagated signal, or combination thereof.

Embodiments of the invention may be implemented utilizing any suitable computer languages (e.g., C, C++, Java, JavaS-cript, Visual Basic, VBScript, Delphi) and may be embodied permanently or temporarily in any type of machine, component, physical or virtual equipment, storage medium, or propagated signal capable of delivering instructions to a device. These software applications, or computer programs may be stored on a computer readable medium (e.g., disk, device), such that when a computer reads the medium, the functions described herein are performed.

In general, elements of embodiments may be connected through a network having wired or wireless data pathways. The network may include any type of delivery system including, but not limited to a local area network (e.g., Ethernet), a wide area network (e.g., the Internet and/or World Wide Web), a telephone network (e.g., analog, digital, wired, wireless, PSTN, ISDN, and/or xDSL), a packet-switched network, a radio network, a television network, a cable network, a satellite network, and/or any other wired or wireless communications network configured to carry data. The network may include elements, such as, for example, intermediate nodes, proxy services, routers, switches and adapters configured to direct or deliver data.

In general, elements of embodiments may include hardware or software components for communicating with the network and with each other. These elements may be structured and arranged to communicate through the network using various communication protocols (e.g., HTTP, TCP/IP, UDP, WAP, WiFi Bluetooth) or to operate within or in concert with one or more other communications systems.

Elements of embodiments may include one or more servers (e.g. IBM® operating system servers, Linux operating system-based servers, Windows NT™ servers, Sybase) within the system.

A number of implementations have been described. Nevertheless, it will be understood that various modifications may be made and that other implementations are within the scope of the following claims.

"VPowerSystem™" is a trademark of Viridity Energy, Inc.

What is claimed is:

1. A method for optimizing the use of electric energy by a facility comprising a plurality of energy assets, the method comprising:
   modeling, using a at least one processor, the usage of electric energy by the facility, by creating a simulation model of the facility;
      wherein the dynamic simulation model of the facility comprises a computation of thermodynamics properties of the facility, and
      wherein the dynamic simulation model is adaptive to at least one physical change in the facility based on a parametric estimation;
   calculating, using the at least one processor, a customer baseline ("CBL") based on the dynamic simulation model, wherein the CBL provides an estimate of energy consumption of the facility as a function of time; and
   determining, using the at least one processor, a plan for controlling the operation of at least one of the plurality of energy assets: (i) to reduce an electricity provider's overall charge to the facility for electric energy, and/or (ii) to provide a revenue source to the facility, the determining being done on the basis of the dynamic simulation model, the CBL, and variations in the price of electric energy in the wholesale market during a defined time period.

2. The method of claim 1, wherein the energy assets comprise at least one of: an energy generation asset, an energy storage asset, an energy usage asset, and a controllable load asset.

3. The method of claim 1, wherein the step of determining a plan for controlling the operation of at least one of the plurality of energy assets is also based on weather prediction data provided to the at least one processor and/or price prediction data provided to the at least one processor.

4. The method of claim 1, wherein said at least one of the plurality of energy assets is a controllable air conditioning unit.

5. The method of claim 1, wherein the facility further comprises an energy storage device and a solar generator in communication with the energy storage device, the method further comprising:
   controlling a use of the solar generation by a control signal automatically generated from data derived using the at least one processor, to charge the energy storage device with solar generation during a time when the forecast wholesale electricity price of energy is below a first predetermined level, and
   controlling the energy storage device by a control signal automatically generated from the data derived from the at least one processor, to discharge the energy storage device to a utility power grid when the forecast wholesale electricity price of energy charged to the facility by the energy provider is above a second predetermined level.

6. The method of claim 1, wherein the facility further comprises an energy storage device in communication with a utility power grid, the method further comprising:
   controlling the energy storage device by control signals automatically generated from data derived from the at least one processor to charge the energy storage device when the forecast wholesale electricity price of energy is below a first predetermined level, and
   controlling the energy storage device by control signals automatically generated from the data derived from the at least one processor to discharge the energy storage device to the utility power grid when the forecast wholesale electricity price of energy charged is above a second predetermined level.

7. The method of claim 1, further comprising generating, using at least one processor, control signals based on the plan.

8. The method of claim 7, further comprising controlling, using the generated control signals, at least one of the plurality of energy assets so that operation of the facility conforms to the plan.

9. The method of claim 1, wherein the dynamic simulation model takes as input at least one of a weather forecast and a prediction of the occupancy of the facility.

10. The method of claim 1, wherein the dynamic simulation model predicts the dynamic load consumption behavior of the facility and the plurality of energy assets.

11. The method of claim 1, wherein the dynamic simulation model is created using an iterative process, and wherein the iterative process comprises tuning the dynamic simulation model based on data representative of physical properties of the facility.

12. A computer system for optimizing use of electric energy by a facility comprising a plurality of energy assets, the computer system comprising:

at least one memory to store processor-executable instructions; and at least one processor communicatively coupled to the at least one memory, wherein, upon execution of the processor-executable instructions, the at least one processor executes a method comprising:

modeling, using at least one processor, the usage of electric energy by the facility, by creating a simulation model of the facility;

wherein the dynamic simulation model of the facility comprises a computation of thermodynamics properties of the facility, and wherein the dynamic simulation model is adaptive to at least one physical change in the facility based on a parametric estimation;

calculating, using the at least one processor, a customer baseline ("CBL") based on the dynamic simulation model, wherein the CBL provides an estimate of energy consumption of the facility as a function of time; and determining, using the at least one processor, a plan for controlling the operation of at least one of the plurality of energy assets: (i) to reduce an electricity provider's overall charge to the facility for electric energy, and/or (ii) to provide a revenue source to the facility, the determining being done on the basis of the dynamic simulation model, the CBL, and variations in the price of electric energy in the wholesale market during a defined time period.

13. The computer system of claim 12, wherein the energy assets comprise at least one of: an energy generation asset, an energy storage asset, an energy usage asset, and a controllable load asset.

14. The computer system of claim 12, wherein the step of determining a plan for controlling the operation of at least one of the plurality of energy assets is also based on weather prediction data provided to the at least one processor and/or price prediction data provided to the at least one processor.

15. The computer system of claim 12, wherein said at least one of the plurality of energy assets is a controllable air conditioning unit.

16. The computer system of claim 12, wherein the facility further comprises an energy storage device and a solar generator in communication with the energy storage device, the method further comprising:

controlling a use of the solar generation by a control signal automatically generated from data derived using the at least one processor, to charge the energy storage device with solar generation during a time when the forecast wholesale electricity price of energy is below a first predetermined level, and controlling the energy storage device by a control signal automatically generated from the data derived from the at least one processor, to discharge the energy storage device to a utility power grid when the forecast wholesale electricity price of energy charged to the facility by the energy provider is above a second predetermined level.

17. The computer system of claim 12, wherein the facility further comprises an energy storage device in communication with a utility power grid, the method further comprising:

controlling the energy storage device by control signals automatically generated from data derived from the at least one processor to charge the energy storage device when the forecast wholesale electricity price of energy is below a first predetermined level, and controlling the energy storage device by control signals automatically generated from the data derived from the at least one processor to discharge the energy storage device to the utility power grid when the forecast wholesale electricity price of energy charged is above a second predetermined level.

18. The computer system of claim 12, wherein the method further comprises generating, using at least one processor, control signals based on the plan.

19. The computer system of claim 18, wherein the method further comprises controlling, using the generated control signals, at least one of the plurality of energy assets so that operation of the facility conforms to the plan.

20. The computer system of claim 12, wherein the dynamic simulation model takes as input at least one of a weather forecast and a prediction of the occupancy of the facility.

21. The computer system of claim 12, wherein the dynamic simulation model predicts the dynamic load consumption behavior of the facility and the plurality of energy assets.

22. The computer system of claim 12, wherein the dynamic simulation model is created using an iterative process, and wherein the iterative process comprises tuning the dynamic simulation model based on data representative of physical properties of the facility.

* * * * *